A. H. BRAECKLEIN.
MACHINE FOR COVERING PIES.
APPLICATION FILED JUNE 19, 1917.

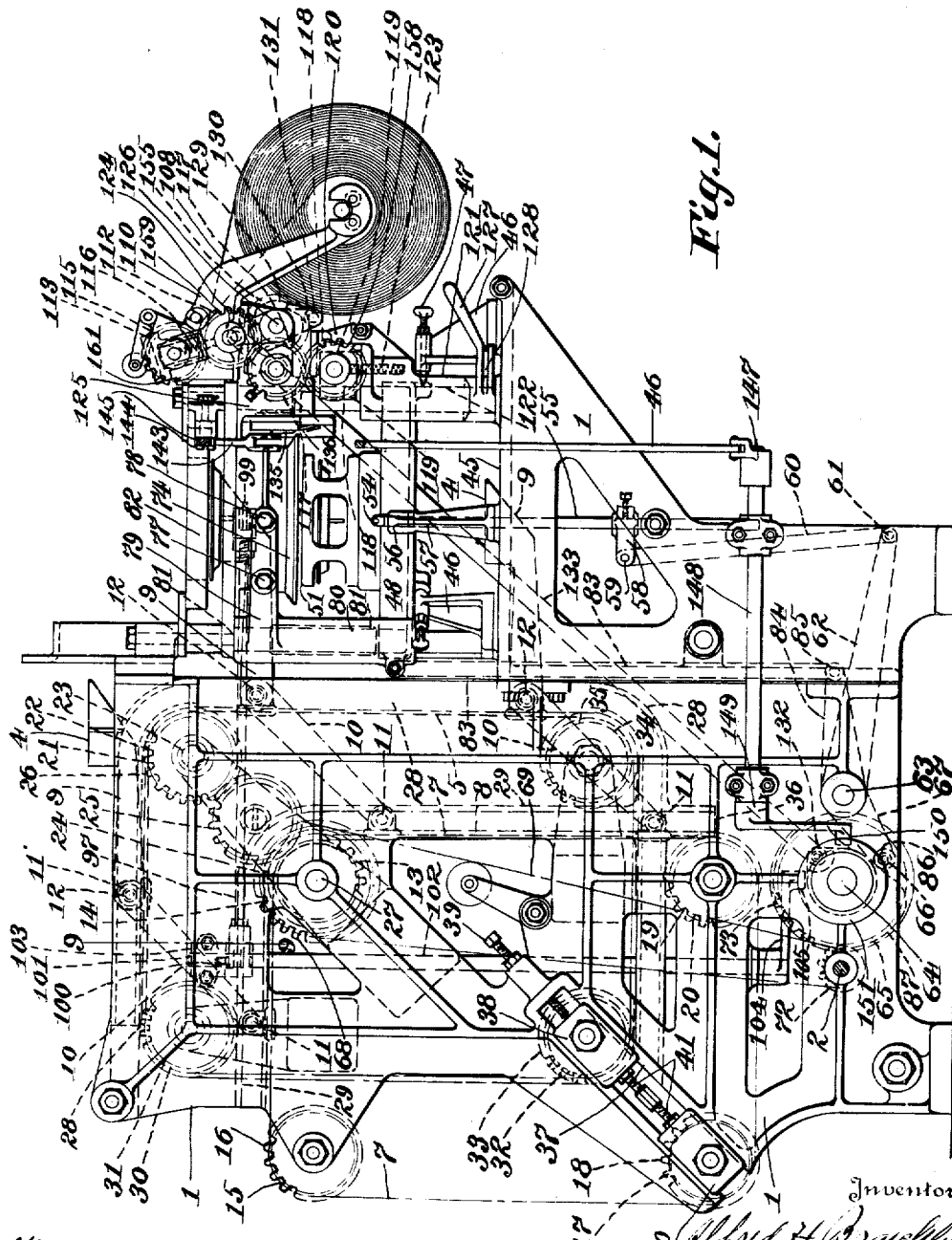

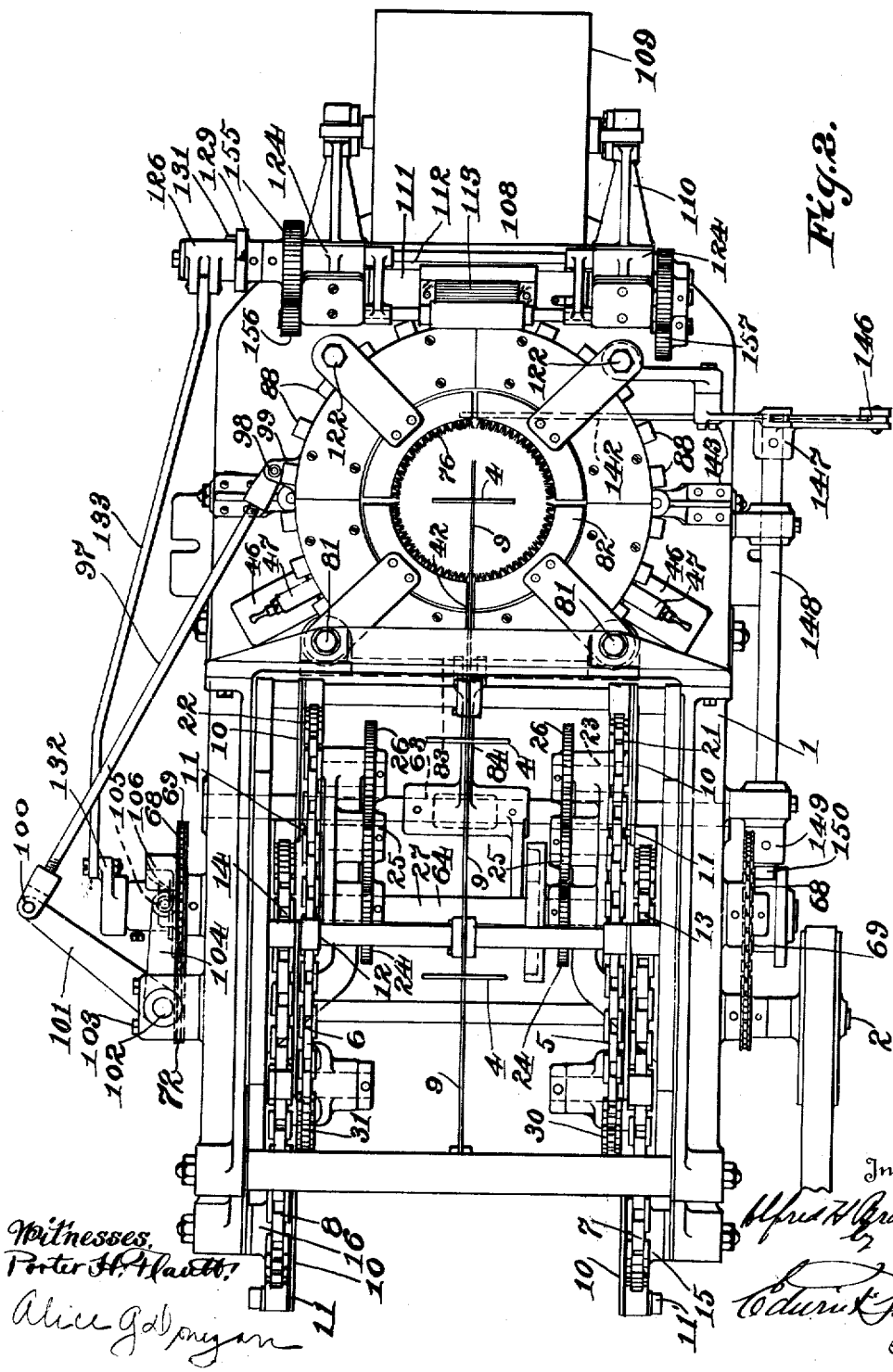

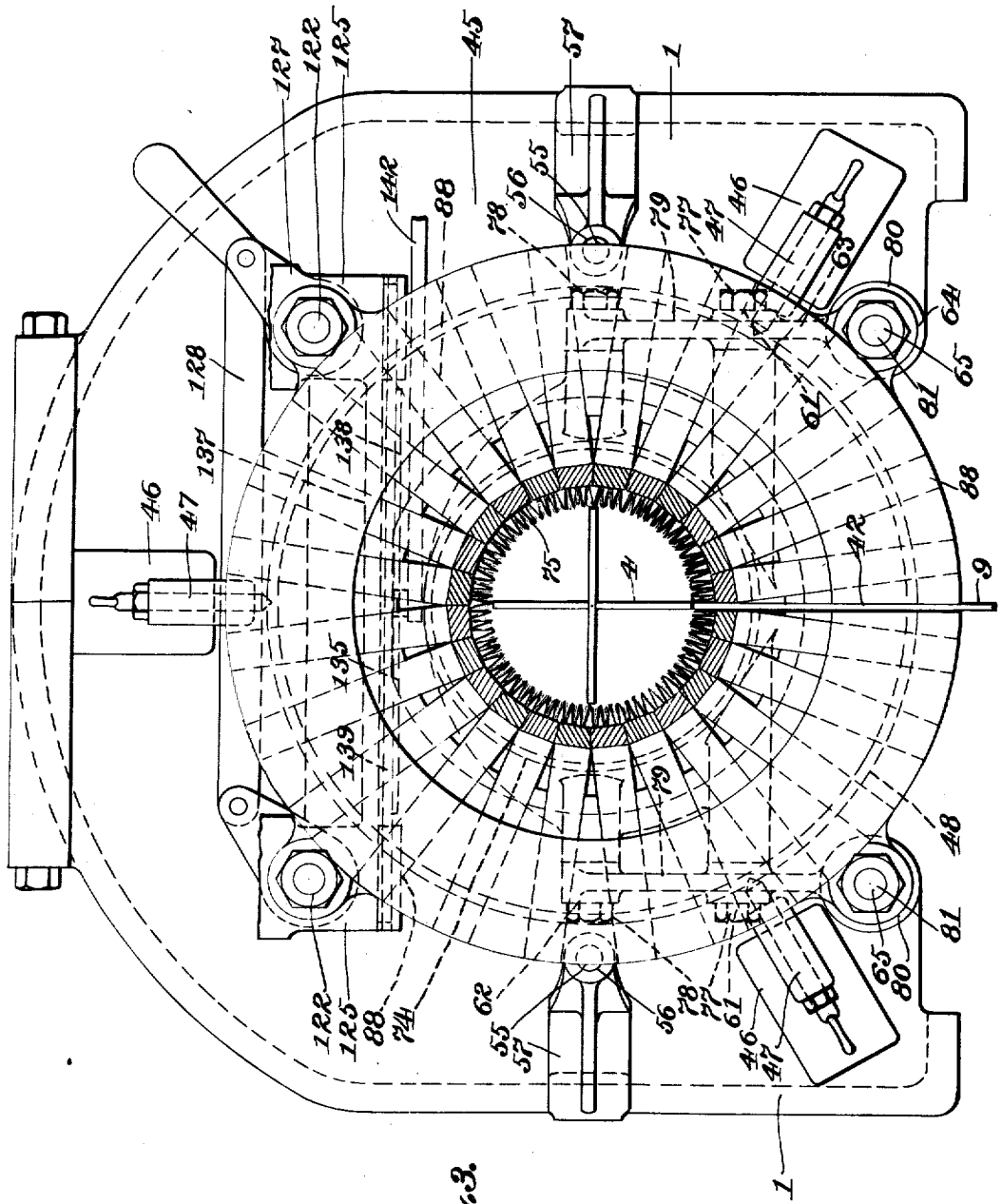

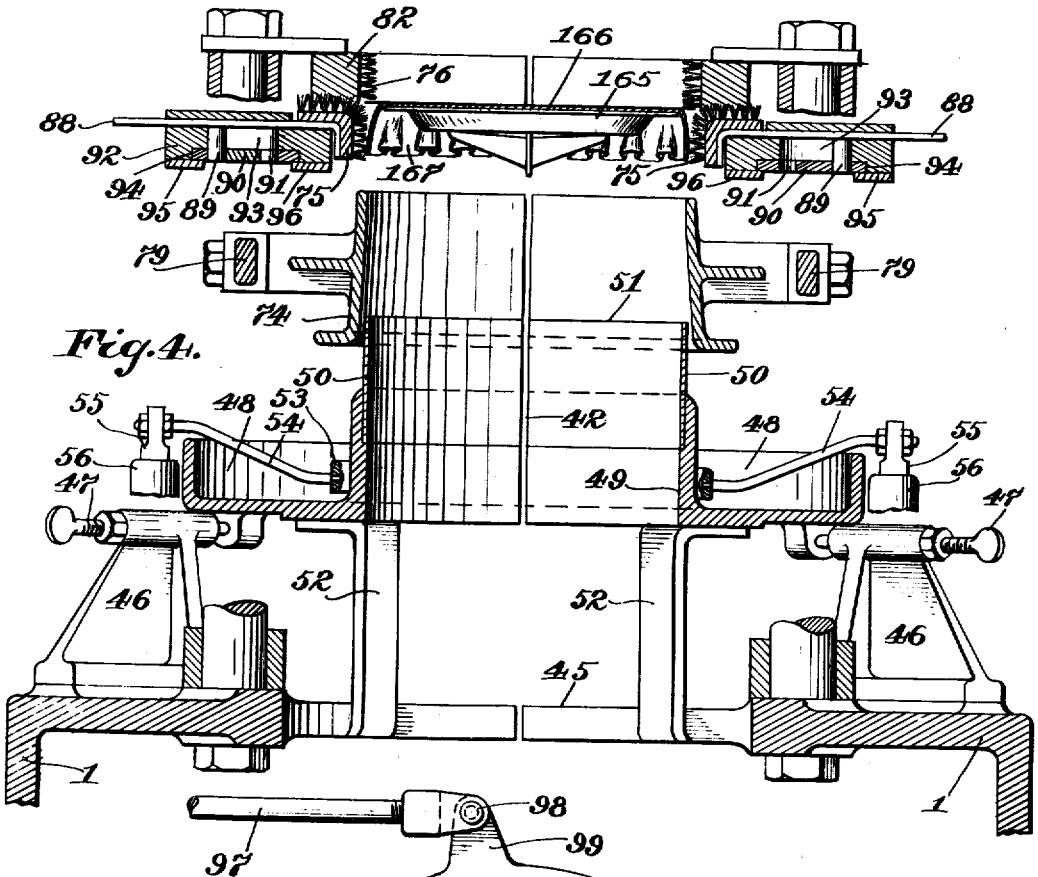

1,266,914.

Patented May 21, 1918.
6 SHEETS—SHEET 5.

Witnesses,

Inventor
Alfred H. Braecklein
By Edwin R. Samuels
Attorney

UNITED STATES PATENT OFFICE.

ALFRED H. BRAECKLEIN, OF BALTIMORE, MARYLAND.

MACHINE FOR COVERING PIES.

1,266,914. Specification of Letters Patent. Patented May 21, 1918.

Application filed June 19, 1917. Serial No. 175,583.

*To all whom it may concern:*

Be it known that I, ALFRED H. BRAECKLEIN, a citizen of the United States of America, residing in the city of Baltimore, State of Maryland, have invented certain new and useful Improvements in Machines for Covering Pies, of which the following is a specification.

Modern standards of hygiene have created the necessity for wrapping and packaging various commodities as bread, cake, flour, cereals, beans, etc., but up to the present time certain commodities, the necessity for wrapping which is fully as great, have been handled and sold without any such protecting cover because of the difficulties incident to wrapping. The ordinary baker's or factory pie is made in large quantities and widely distributed to the public, both in wagons and through numerous small retail dealers by whom they are often kept for several days under most unsanitary conditions before they are finally disposed of. The failure to inaugurate in connection with the distribution and sale of pies the same sanitary conditions which prevail in the distribution of other commodities can be explained only by the lack of an automatic machine capable of wrapping pies and the impracticability of wrapping them by hand. The object of the present invention is to provide a machine by means of which pies may be handled without injury and wrapped automatically with very small expense in time and materials.

In its broader conception, the invention consists in a feeding device for supporting the pies and feeding them forward through the machine, maintaining them in position, right, *i. e.*, top side up, throughout the traverse, a paper feeding device for bringing a piece of paper into the path of each pie in turn, and means for wrapping each piece of paper about the corresponding pie and fastening it in wrapped position.

More specifically, the feeding device and the wrapping element are so arranged that the pie may be given a continuous traverse, the wrapping operation taking place as the pie passes up through the machine. At the same time the paper is fed into the machine.

In the preferred form of the invention, the blanks or pieces of paper are each given a circular crease conforming to the edge of the pie and after the creasing operation, each blank is caught by the pie to which it is to be applied and carried forward or upward, the edges or flaps of the blank which are coated with paste being folded under and stuck.

The preferred form of the machine embodying the invention consists of a series of substantially circular folding and pasting members arranged in axial alinement one over the other with means for supplying paper in sheets of suitable sizes to the folding means and a series of carriers for the pies and means for moving the carriers upward on a fixed path concentric with the folding and pasting means. In the present form of the invention, the carriers are actuated by chains which during the traverse of the carriers through the folding means, are guided to move on a path parallel to the axes of such folding and pasting means.

In the accompanying drawing, I have illustrated a machine embodying the invention in its preferred form.

Figure 1 is an assembly of the machine in side elevation;

Fig. 2 is a plan;

Fig. 3 is a plan of the folding brushes;

Fig. 4 is a vertical central section through the folding and pasting members; also the feeding platform looking to the left in Fig. 1;

Fig. 5 is a plan of the cam which actuates the folding brushes;

Figure 7:
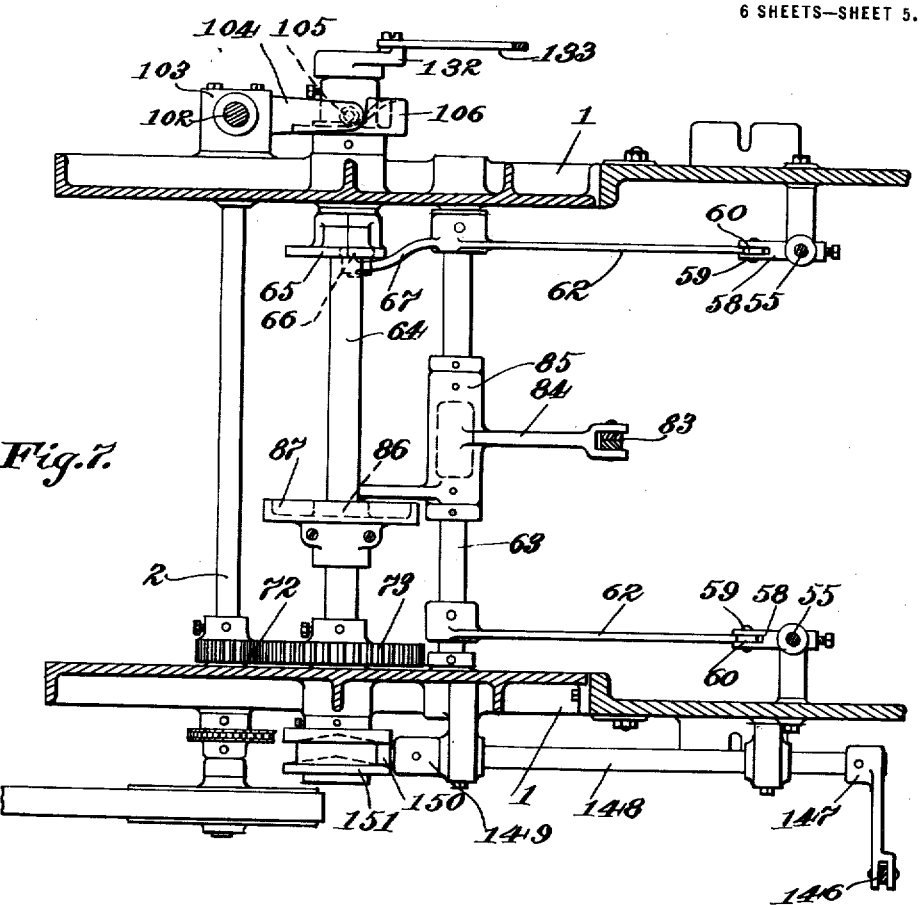
Fig. 7 is a plan of the cam shaft, etc.

Referring to the drawings by numerals, each of which is used to indicate the same or similar parts in the different figures, the machine, as shown, consists of two parallel side frames 1, suitably spaced and bolted, and forming a support for the moving parts already referred to in general terms. These parts are driven by suitable gearing from the main drive shaft 2 which in turn receives rotary motion from any suitable motor. The moving parts include carriers 4, on which the pies are carried through the folding and wrapping members. These are mounted on the four chains 5, 6, 7, 8 which are moved contra-clockwise in parallel relation as shown. The mechanism supporting and actuating each carrier in connection with the chain includes a carrier arm 9 and two guide links 10. The links 10 are connected at each end to corresponding links of the chains 5, 7, 6, 8, the chain links and guide links being joined at their ends by studs 11, 12. To the studs 12, which extend across from chain 5 to chain 6, the guide links 10 and the carrier arms 9 are keyed or otherwise non-rotatably connected. The studs 11, as shown, are short, joining each guide link 10 at its guiding end to the corresponding link of chain 7 or 8. The chains as shown are operated in parallel relation, the inner chains 7, 8 passing over sprockets 13, 14 on the chain drive shaft 27, and over idlers 15 and 16 at the upper rear, adjustable idlers 17 and 18 at the lower rear and idlers 19 and 20 at the lower front. The outer chains 5, 6, pass over duplicate sprockets 21, 22 on short shafts 23 driven from toothed gears 24 on the chain drive shaft 27 which meshes with an idler 25 which in turn meshes with a toothed gear 26 on the shaft 23. These outer chains 5 and 6 pass over idlers or guide sprockets 30, 31 at the upper rear, 32, 33 at the lower rear, and 34, 35 at the lower front. While the two sets of chains 5 and 6 are shown as forming two rectangles with their corresponding sides parallel, the important thing is to have the upward traverse of the two chains parallel or substantially parallel so that they guide the carriers 4 and the carrier arms 9 in a straight line during their upward traverse through the gripping, folding, pasting mechanism, and so forth.

To prevent play of the carriers and to guide them and limit their path to a straight line while in coöperation with the pasting, folding, feeding and cutting mechanism, I have provided rigid guides 28 and 29 for the chains. These guides are in the form of channels of any suitable cross-section. The guides 28 for the lower horizontal and forward or vertical portion of the outside chain and the corresponding portion of the inside or rear chain are open near the bottom, preferably at points where they are tangent to the corresponding guide pulleys, and the chains or links of the chains enter at these openings, the entrance to the guideway 29 being indicated by reference character 36 and to the guide-way 28 by reference character 37. The studs are provided with rollers 11' which engage the guideways.

The idlers 32 and 33 are shown as mounted on sliding blocks 38 adjusted by means of tension screws 39 to give the requisite adjustable tension to the chains 5 and 6 and the idlers 17 and 18 are mounted on sliding blocks 40, the distance between which and the blocks 38 is adjusted by screws 41 so that the tension of both chains can be adjusted together by the screw 39 and the relation between the tension of the two belts by the screws 41. The studs 11 joining the guide links 10 to the links of the chains 7 and 8 and the studs 12 joining the links of the chains 5 and 6 in pairs, the guiding links 10 and the carrier arms 9 being keyed to the studs 12, have already been described. The carrier arms 9, as will be seen by reference particularly to the plan views, are thin, flat pieces of sheet metal adapted to move upward through slots 42, see Fig. 5, in the folding and pasting mechanism carrying the pies forward or upward in operative relation to this mechanism. The carriers 4 at the ends of the arms 9 are formed by bending the metal in the form of a cross forming a support which as seen in plan appears to be a cross of thin sheet metal with the flat sides vertical, the supporting arm being itself of the same material placed with its flat side in a vertical plane, see Fig. 2.

Referring to Fig. 4 which is a vertical section showing the folding and pasting mechanism, there is a feeder platform 45 from which the pies may be fed to the carriers, this feeding operation being either manual or by a belt conveyer or whatever means is found most convenient. Mounted on suitable supports 46 on the feed table 45 and secured to the supports by screws or other suitable fastenings 47, is an annular paste pot 48 having a central, circular opening 49 of diameter larger than the pies to be wrapped. The opening 49 is surrounded by a wall 50 carrying a circular or cylindrical creasing edge 51. Depending from the paste pot and arranged around the opening 49 are several guide fingers 52. These are preferably sprung slightly outward, i. e., away from the opening at the bottom. Coöperating with the paste pot, is a paste ring 53 of a diameter in excess of that of the pies and large enough to fit freely in the paste pot around the circular upright wall 50. The paste ring 53 is mounted on radial arms 54, two in number on opposite sides, extending outward from the ring and fastened at their ends to upright sliding rods 55 mounted to slide in suitable bearings 56 on brackets 57 on the feed table 45. Each of the rods 55 carries an adjustable wrist pin block 58 with a wrist pin 59 to which is pivoted a connecting rod 60 and the connecting rods 60 are in turn pivoted at 61 to the ends of swinging arms 62 keyed to a shaft 63 mounted in the frame adjacent the cam shaft 64 on which is mounted a cam 65 engaging a roller 66 carried by an arm 67 on the shaft 63, which arm 67 in the present instance is integral with one of the arms 62. The cam shaft 64, according to the present illustration, is driven from the main shaft 2 by a small toothed pinion 72 on shaft 2, which meshes with a toothed pinion 73 on the cam shaft 64. By means of the mechanism shown, the shaft 63 is rocked at intervals moving the connecting rod 60 and the rod 55 up and down, dipping the paste ring 53 into the paste and then raising it several inches to form a corresponding ring of paste on the wrapping paper as hereinafter described.

The group of mechanism illustrated in Fig. 4 which accomplishes the pasting, creasing, covering and final wrapping of the pie, includes in addition to the paste pot and pasting mechanism already described, a creaser funnel 74 coöperating with the creaser edge 51, and radially moving brushes 75 with means for actuating them, and an annular brush 76. The creaser edge 51 is mounted on the paste pot as already described and is stationary. The creaser funnel 74 coöperating therewith, is mounted to reciprocate in a vertical direction, being for this purpose secured by means of bolts 77, 78, see Fig. 3, to rigid arms 79 extending outward horizontally from hubs 80 on the two upright shafts or studs 81, secured at their lower ends in the feed table 45 and at their upper ends serving to support the brush frame 82. By moving the hubs 80 up and down, the funnel 74 is given the desired reciprocating motion.

The vertical reciprocating motion is imparted to the hubs 80 by means of connecting rods 83 which may be arranged in any convenient manner but in the form of the invention shown are joined at the bottom in the manner of a Y and pivotally connected at the lower end to a lever 84 intermediately pivoted on the shaft 63 swinging freely in relation thereto and carrying on its end opposite the pivot 85 a follower 86 which rides on a cam 87 on the cam shaft 64.

In the operation of wrapping the pie, the brushes 75 move inward radially turning the creased, paste-coated edges of the paper inward against the plate from beneath. This inward radial motion is accomplished by mechanism shown in plan in Fig. 5 and partly in elevation and section in Fig. 4. The radially moving brushes 75 are mounted each on a radially disposed carrier 88 and each carrier is provided with a depending follower pin 89. Just beneath the brushes and concentric therewith is a circular, or more properly, an annular, cam member 90. This cam member has a series of slots 91 inclined to the radius, shown at an angle of about 45°. There is one of these slots to each radial brush. There is also, forming part of or secured to the frame directly beneath the brushes and supporting them, a circular or annular stationary member 92 having radial slots 93 corresponding to the inclined slots 91. The depending pins 89 pass each through one of the radial slots of the frame or stationary member 92 and through one of the inclined slots of the annular cam member 90. It is easily apparent that by oscillating the cam member in its bearing 94 which is an annular groove in the stationary member 92 in which it is held by flat rings 95 and 96, the brush carriers and brushes are moved in and out radially. This is further illustrated by the diagrammatic showing of the superimposed radial and inclined slots at the right-hand side of Fig. 5. The oscillatory motion is imparted to the annular cam member or ring 90 by means of a connecting rod 97 pivotally connected at 98 to a radial arm 99 projecting from the annular cam member. The connecting rod is pivotally connected at its free end at 100 to a swinging arm 101 rigidly secured to and oscillating with a vertical shaft 102 mounted in suitable bearings 103 in the machine frame. This shaft 102 has secured to its lower end a follower arm 104 carrying at its swinging end a depending follower 105 which engages a cam 106 on the cam shaft 64.

The additional motions relate to the paper-feeding and paper-cutting mechanism. The wrapping paper may be provided in any suitable manner but in the form of the invention shown, the paper is fed from a web 108 carried on a roll 109 pivoted on suitable brackets 110 at the front of the machine. From the roll, the web is led through printing rollers 111 and 112 of which one in the present instance is shown as provided with type 113.

The upper printing roller 111 is mounted in sliding bearings 115 controlled by springs 116 which tend to support the roller. Below the printing rollers 111 and 112 are the feed rollers 117 and 118. The lower feed roller 118 is journaled in blocks 119 carried each in a U-shaped arm 120 one on each of two hubs 121 which slide on the upright studs 122 on the table, there being two such studs one at each end of the roller corresponding to the studs 81. Each of the blocks 119, as shown, has a considerable amount of vertical play in the U-shaped carriers 120 and is supported in the carrier by springs 123. The hubs 121 are adjustable to vary the grip of the rollers by means of spiral cams or hand clamps 127 connected to operate together by connecting rod 128. The upper feed roller 117 and the roller drive shaft 126 are mounted in brackets 124 carried by hubs 125 one at each end of the rollers on the upright studs 122, the hubs being connected together in the form of the invention shown by knife bar 137 so that they form a single casting. The brackets 124 at the ends of the hub casting 125, have secured to them brackets 110 carrying the bearings for the paper roll 109 and the printing rollers 111 and 112. The two brackets 124 and 110 may of course be made in any suitable form, the brackets 110 being either separate or integral. The roller drive shaft 126 carries rigidly secured to it a ratchet 129 operated by a pawl 130 carried by a pawl arm 131 swinging on the shaft 126 and actuated by a crank 132 on the cam shaft 64 connected to the pawl arm 131 by a suitable connecting rod 133. This gives a step by step rotation of the shaft 126 which is communicated to the rollers 111, 112, 117, 118 by suitable gears on the roller drive shaft 126 in train with gears carried by the respective rollers or the shafts therefor.

The shaft 126 carries secured thereto a large gear 155 which meshes with a small gear 156 on the shaft of the roller 117. The roller 117 in turn carries a gear 157 of pitch diameter about the same as that of the roller which meshes with a gear 158 of the same diameter on the roller 118. This shaft also carries a larger gear 160 of pitch diameter about the same as that of the roller which meshes with a gear 161 on the shaft of the upper printing roller 111. In this way a multiplied motion as compared to that of the shaft 126 is imparted to both the printing rollers and the feed rollers, the surface space of these two sets of rollers being the same, sufficient to feed paper comprising one blank at each stroke of the pawl.

As shown, the paper is led from the grip of the printing rollers 111 and 112 about the lower printing roller 112 and then into the grip of the feed rollers 117 and 118. The paper then passes between the knife 135 and the cutting block 136 and thence between the creaser funnel 74 and the creaser edge 51.

Figure 6:
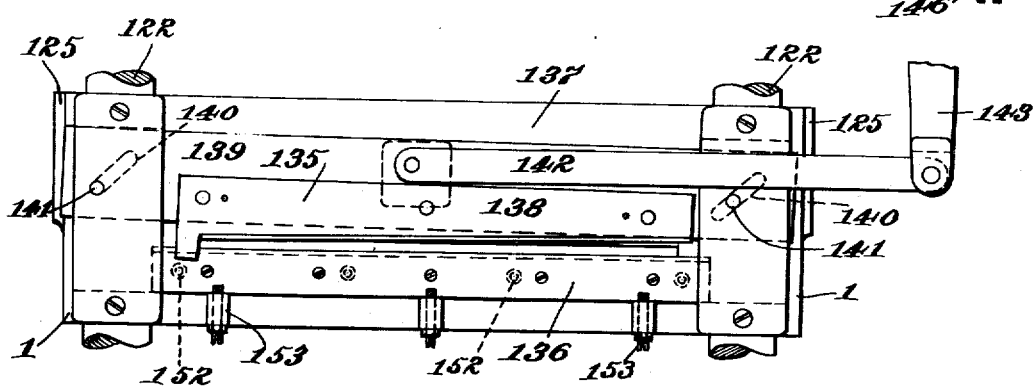
Fig. 6 is a view of the knife supporting and actuating mechanism looking to the right in Fig. 1.
Figure 8:
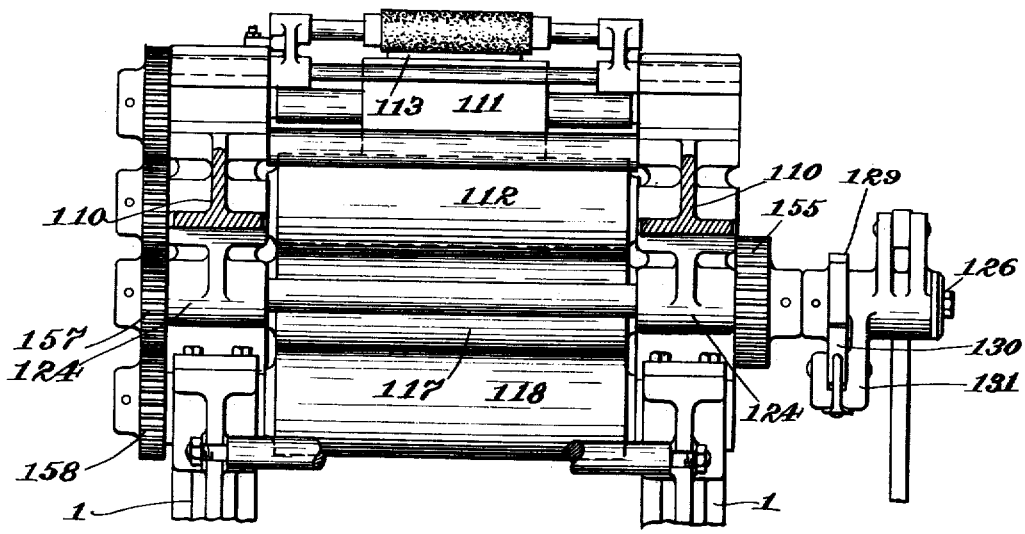
Fig. 8 is an elevation of the roller looking from the right in Fig. 1.
Figure 9:
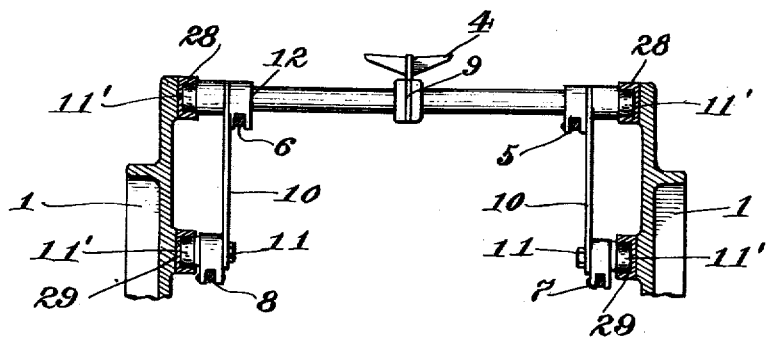
Fig. 9 is a section on line 9, 9 of Fig. 1, looking to the right.

The mechanism for operating the knife is shown in detail in Fig. 6 which is an elevation looking toward the right in Fig. 1. The knife blade proper 138 is mounted on a suitable carrier or casting 139 having similarly inclined slots 140 at each end. The hub casting 125 is also provided at each end with horizontal projecting pins 141, each corresponding to one of the slots 140 in which the pins are seated, and there is a connecting rod or link 142 connecting the knife carrier 139, as shown, at a point near the center thereof to a swinging lever 143. The swinging arm 143 in the form of the invention shown, constitutes the vertically depending arm of a bell crank lever 144 having a horizontal arm 145 pivotally connected to a vertical depending connecting rod 146 pivotally connected at its lower end to an arm 147 secured to an oscillating shaft 148 having rigidly secured thereto at its rear end a follower arm 149 with a follower 150 engaging a cam 151 on the cam shaft 64. The operation of the cam imparts to the knife carrier 139 a tendency to reciprocate in a horizontal direction, but the inclined slots 140 engaged by the pins 141 control the operation of the knife carrier and confine its motion at the two ends to lines parallel to the direction of the slots so that at each stroke the knife descends with a drawing motion which improves its cutting effect as compared to that incident to a vertical motion, and eliminates the tearing of the paper. As the knife descends, it coöperates with the cutting block 136 which is also supported the casting 125 as it is tipped outward on by means of springs 152 and supported in front by screws 153; its position relative to the knife edge is regulated by means of the screws.

In the operation of the machine, the chains 5, 6, 7 and 8 move continuously contra-clockwise along the parallel rectangular paths indicated in Fig. 1, the sprockets 13, 14 on the shaft 27 being driven by the sprockets 68 on the same shaft which carries the chain 69 passing over a sprocket 72 on the main shaft 2. The sprockets 13 and 14 and the sprockets 21, 22 being at the upper end of the vertical upwardly moving portions of the chain at the right impart the entire driving impetus to the chains and the work is performed during this same upward traverse. The carriers 4 supported on the carrier arms 9 and guided by the guide links 10 pass during this upward traverse directly through the center of the feed table 45, the paste pot 49, creasing edge 51, creasing funnel 74, and the brushes 75, 76, see particularly Figs. 2 and 4, the carrier arms 9 passing through the slot 42 which cuts all the circular members shown in Fig. 4.

At the same time that the pie is passed upward through the pasting and folding mechanism, paper is fed between the creasing edge 51 and the funnel 74 and a blank of sufficient size is severed by the operation of the knife 135, it having already been noted that the motion of the rollers is a step by step motion, the knife stroke taking place between the steps so that at each step, *i. e.*, each stroke of the pawl 130, the paper is fed forward and between the strokes a blank is cut off. To accomplish this result, the rollers are connected to the ratchet by a multiplying train of gears as described. The paper as soon as it arrives in registration with the crimping mechanism is coated with paste by the action of the paste ring 53, the paste being applied in a circular zone just outside the crimping mechanism. When the paper is severed, the crimping funnel is lowered and as soon as it completes its downward stroke, the funnel moves up releasing the crimped blank and the corresponding pie, the carriers being so spaced that one pie passes through the apparatus for each blank severed, coming in contact with the blank from beneath and carrying it upward through the funnel. Next, the pie carrying the crimped blank with the crimped edges projecting downward over the sides of the plate, comes into operative relation with the brush members. The stationary brushes hold the paper at the edges of the plate and the radially moving brushes 75 are thrust inward under the edge of the plate, pressing the paste-coated skirt of the paper blank into contact with the bottom and sides of the plate.

A pie in the process of wrapping is indicated at 165 in Fig. 4, the same being covered by a blank 166 with paste-coated depending skirt 167. The skirt or edges of the paper may be of any desired length and turned in to any desired extent but the most efficient and economical proportion, so far as known, is indicated in the illustration.

I have thus described my invention specifically and in detail in order that its nature and operation may be fully understood; however, the specific terms herein are used descriptively rather than in their limiting sense and the details and structure of the machine may be widely varied within the scope of the invention.

What I claim and desire to secure by Letters Patent is:

1. In a machine for wrapping pies, pasting, creasing and folding means arranged successively in axial alinement, and means for moving a pie in the direction of its axis through and in operative relation with each of said means successively.

2. In a machine for wrapping pies, pasting and folding mechanism, carriers for the pies, a carrier arm for each carrier and a guide link for controlling each carrier arm, a chain to which each carrier arm is secured to move them on a fixed path, a second chain, means for moving both chains, the guide links being connected to the second chain to guide and control the carrier arms and the carriers.

3. In a machine for wrapping pies, pasting and folding mechanism, carriers for the pies, a carrier arm for each carrier and a guide link for controlling each carrier arm, a chain to which each carrier arm is secured to move them on a fixed path, a second chain, means for moving both chains, the guide links being connected to the second chain to guide and control the carrier arms and the carriers and keep the pies upright during their entire traverse.

4. In a machine for wrapping pies, pasting and folding mechanism to fit the circumference of the pie arranged in alinement, carriers for the pies, a carrier arm and a guide link for each carrier, the pasting and folding mechanism being slotted to admit the carrier arms, an endless chain a portion of which is parallel to the direction of alinement of the pasting and folding mechanism, the carrier arms being connected to said chain, a second chain a portion of which is parallel to the portion of the first chain referred to, the guide links being connected to said chain to control the position of the carriers.

5. In a machine for wrapping pies, pasting and folding mechanism to fit the circumference of the pie arranged in alinement, carriers for the pies, a carrier arm and a guide link for each carrier, the pasting and folding mechanism being slotted to admit the carrier arms, an endless chain a portion of which is parallel to the direction of alinement of the pasting and folding mechanism, the carrier arms being connected to said chain, a second chain a portion of which is parallel to a portion of the first chain referred to, the guide links being connected to said chain to control the position of the carriers, causing the pies to move through the machine in upright position.

6. In a machine for wrapping pies, a paste pot having a central opening to admit the pie, a creasing funnel and blade in alinement with the opening and of corresponding shape, a series of brushes arranged in a hollow figure of corresponding shape and mounted to move toward and from the opening which is in alinement with the paste pot, funnel and so forth, a member having radial slots and a member having inclined slots with studs on the brushes engaging the slots whereby the brushes are moved in and out by relative motion of the slotted members, and inwardly disposed stationary brushes arranged to inclose an opening in alinement with the opening inclosed by the radial brushes, the paste pot, creasing blade, funnel and brushes being slotted in alinement to admit a carrier arm.

7. In a machine for wrapping pies, a paste pot having a central opening to admit the pie, a creasing funnel and blade in alinement with the opening and of corresponding shape, a series of brushes arranged in a hollow figure of corresponding shape and mounted to move toward and from the opening which is in alinement with the paste pot, funnel and so forth, and inwardly disposed stationary brushes arranged to inclose an opening in alinement with the opening inclosed by the radial brushes, the paste pot, creasing blade, funnel and brushes being slotted in alinement to admit a carrier arm.

8. Means for folding the creased skirt of a pie wrapper consisting of a series of separately mounted, brushes arranged about a hollow figure corresponding to the periphery of the pie, and means for moving the brushes inward radially.

9. In a machine for wrapping pies, means for supplying paper blanks, means for moving the pies through the machine holding them during the entire traverse in upright position and bringing them into contact with the blanks so that the paper is spread over the top of the pie, circularly arranged means for turning the edges of the blanks downward about the edges of the pie, circularly arranged and inwardly traversing means for folding said edges under the pie, and means for fastening them in folded position.

10. A machine for wrapping pies consisting of means for feeding the pies forward through the machine holding them during the entire traverse in upright position, means for placing a piece of paper over the top of the pie so as to cover the pie and project beyond the edges, circularly arranged means for turning the projecting edges downward over the edges of the pie, circularly arranged and inwardly traversing means for folding said edges under the pie, and means for sticking the projecting portions to the under side of the plate.

11. In a machine for wrapping pies, a carrier for moving the pies in the direction of the axis, supporting means for the carrier, a paste pot having a central opening to admit the carrier, and a slot to admit the supporting means, the central opening and the slot being bounded by a wall to retain the paste.

12. In a machine for wrapping pies, a paste pot with a central opening for the pie, a carrier for moving the pies through the opening, and means for applying the paste to the wrapper.

13. In a machine for wrapping pies, a paste pot with a central opening for the pie, a carrier for moving the pies through the opening, means for applying the paste to the wrapper, a funnel over the paste pot, and folding means over the funnel.

Signed by me at Baltimore, Maryland, this 2nd day of June, 1917.

ALFRED H. BRAECKLEIN.

Witnesses:
ZELLA KUHN,
PORTER H. FLAUTT.